US010977892B2

(12) United States Patent
Gugler et al.

(10) Patent No.: US 10,977,892 B2
(45) **Date of Patent: *Apr. 13, 2021**

(54) GAMING MACHINE HAVING SETS OF REELS

(71) Applicant: NOVOMATIC AG, Gumpoldskirchen (AT)

(72) Inventors: Martin Gugler, Gumpoldskirchen (AT); Oliver Bartosik, Gumpoldskirchen (AT)

(73) Assignee: Novomatic AG, Gumpoldskirchen (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/555,594

(22) Filed: Aug. 29, 2019

(65) Prior Publication Data

US 2019/0385403 A1 Dec. 19, 2019

Related U.S. Application Data

(63) Continuation-in-part of application No. 14/432,458, filed as application No. PCT/EP2013/069598 on Sep. 20, 2013, now Pat. No. 10,535,218, which is a continuation-in-part of application No. 13/631,670, filed on Sep. 28, 2012, now abandoned.

(51) Int. Cl.
*A63F 13/00* (2014.01)
*G07F 17/32* (2006.01)
*G07F 17/34* (2006.01)

(52) U.S. Cl.
CPC ...... *G07F 17/3213* (2013.01); *G07F 17/3244* (2013.01); *G07F 17/34* (2013.01)

(58) Field of Classification Search
CPC ... G07F 17/3213; G07F 17/34; G07F 17/3244
See application file for complete search history.

(56) References Cited

U.S. PATENT DOCUMENTS

| | | | | |
|---|---|---|---|---|
| 6,579,178 | B1 * | 6/2003 | Walker | G07F 17/32 273/138.2 |
| 2006/0052152 | A1 * | 3/2006 | Tedsen | G07F 17/3211 463/16 |
| 2008/0108409 | A1 * | 5/2008 | Cole | G07F 17/3265 463/20 |

* cited by examiner

*Primary Examiner* — Omkar A Deodhar
*Assistant Examiner* — Eric M Thomas
(74) *Attorney, Agent, or Firm* — Blue Filament Law PLLC

(57) ABSTRACT

A gaming machine operable under control of a processor includes a processor for controlling the gaming machine, an interface in electronic communication with the processor and at least one set of primary reels displayed at the interface, the set of primary reels having a plurality of symbols. The gaming machine also includes at least one set of secondary reels displayed on the interface. The secondary reel has a plurality of symbols and an intersecting region. The intersecting region intersects a portion of the at least one set of primary reels. Preferably the gaming machine has four sets of primary reels having corners and a single set of secondary reels that overlaps at least one corner of each of the sets of primary reels. The sets of reels can include physical, electronic or otherwise simulated sets of reels.

17 Claims, 7 Drawing Sheets

GAMING MACHINE HAVING SETS OF REELS

RELATED APPLICATIONS

This application is a continuation-in-part of U.S. Ser. No. 14/432,458 filed Mar. 30, 2015 and now U.S. Pat. No. 10,535,215; that in turn is a US national phase application of International Application PCT/EP2013069598 filed Sep. 20, 2013; that in turn is a continuation in part of US Serial Number filed Ser. No. 13/631,670 filed Sep. 28, 2012; the content of the aforementioned are hereby incorporated by reference.

FIELD OF THE INVENTION

The invention pertains to gaming machines and particularly to slot machines having multiple sets of reels.

BACKGROUND OF THE INVENTION

In the gaming machine industry, there is a continuing need for gaming machine manufacturers to produce new types of games, or enhancements to existing games, which will attract frequent play by enhancing the entertainment value and excitement associated with the game.

Slot machines are examples of gaming machines which have entertained users for many decades. Slot machines display symbols from sets of reels that spin and stop at random positions. A portion of the symbols on each set of reels are displayed to a user. The user is awarded a payout based on a winning combination of symbols appearing on a payline defined across the sets of reels. Known slot machines may award payouts, credits and bonuses for combinations of scatter symbols, wild symbols, paylines, and other variants.

Slot machines may be stand alone kiosk-type devices or networked kiosks that enable a jackpot according to some pre-defined criteria. Slot machines may also be electronic devices, including general purpose computers, programmed with a slot machine application. Gaming machines, including slot machines and various electronic devices can be networked with numerous devices enabling substantial jackpots. Electronic devices that function as slot machines may also include hand-held devices such as notepad computers or smart phones.

There is a constant need to provide users with new variants of gaming machines to attract users and keep them entertained. Manufacturers have varied slot machines to increase the number and variety of winning combinations, i.e. paylines. A payline may consist of any number or configurations of positions of gaming symbols. For example, a payline in a set of reels may consist of a horizontal line of gaming symbols along the reels, or a diagonal line of gaming symbols along the reels, or a line overlapping several rows along the reels. It is well known to provide slot machines with multiple paylines.

Providing more variety and opportunities holds the user's interest for a longer time and also enables the manufacturer to have a wider range of payouts for the winning combinations. Unfortunately, increasing the complexity of the game may require more computing resources to determine the paylines, or the machine may run slower than optimal. Also increasing the complexity of the game risks that a user may not readily follow how wins result, which diminishes the user interactivity and enjoyment.

Some gaming machines have become rather complex in comparison to the conventional machines of the pas having one set of three reels. Currently, many slot machines have a display with one set of five reels with three gaming symbols visible on each reel. This results in a visible set of gaming symbols in a three by five matrix configuration. Many of five reel slot machines have nine paylines, although twelve, fifteen, twenty and twenty-five or more paylines are becoming common.

Slot machines may utilize reel sets having more than five reels and more than three visible gaming symbols on each reel, such as a ten reel configuration with ten visible gaming symbols on each reel. This creates a 10.times.10 matrix of symbols i.e ten rows and ten columns. Such a slot machine may have an enormous number of potential paylines with just one set of reels.

With the increased complexity of the number and the positioning of the paylines on a singular set of reels, it becomes increasingly unwieldy for gaming software to evaluate a winning combination or combinations of gaming symbols. The calculations required take time, and even advanced computing capacity has limits. At some point, adding complexity may not increase user enjoyment. Multiple winning combinations, such as hundreds of paylines, may also become too complex for the typical user. For example, a user receiving a payout after a given spin of the reels may find it difficult to determine how, where or what just happened.

Current gaming machines also provide secondary or bonus games in addition to primary games. These bonus games are generally different from the primary game. The bonus games are typically played separately from the primary game. For instance, secondary or bonus games may be evaluated with a different set of predetermined combinations of the gaming symbols and different paylines. Bonus games may also include completely different games.

U.S. Pat. No. 7,594,851 to Falconer describes multiple sets of reels for slot machine play. The sets of reels are either stacked in a vertical orientation, or aligned in a horizontal orientation. The sets of reels are identical and rotate, or appear to rotate, to random orientations. Paylines are defined on each reel and also between reels depending on game play rules. This enables a variety of betting opportunities as compared to standard play slot machines having a single reel.

There is also a game on the market named Gazellions™ and marketed by Aristocrat Technologies, Inc. having multiple slot machine reels arranged in a grid format having a total of four reel sets arranged in a 2.times.2 grid. The grid has a small space between reel sets. This arrangement makes sense to optimize space consumed by the reel sets, and also increases the variety of betting opportunities because particular reels can be selected for improved payouts, whereas prior game versions rely on selecting particular paylines for improved payouts.

The gaming industry is competitive and ever-evolving. Although many games continue to entertain gaming enthusiasts, there is still an unmet need for enhanced games and game control.

SUMMARY OF THE INVENTION

A gaming machine operable under control of a processor includes a processor, memory and an interface interconnected in electronic communication to enable a user to enjoy the gaming machine. The memory stores application software which, in combination with the processor, controls the gaming machine. Preferably, the gaming machine is a stand-alone kiosk, however, in various embodiments the gaming machine may take the form of an electronic device such as a note pad computer, a smart phone, a laptop computer, or a kiosk in a networked setting. The software may be stored locally or accessed via a network. Payouts may be tied to the networked environment of the gaming machine, or odds based on a non-networked gaming machine.

The gaming machine includes an interface having a display, speakers and input buttons accessible by a user. In one embodiment, the display is touch-sensitive, and may include a transparent touch sensor overlay.

The gaming machine is preferably a slot-machine having multiple reels. The interface displays at least one set of primary reels. The primary reels each having a plurality of symbols. The primary reels are arranged adjacent to each other, with space separating each adjacent reel. In one embodiment four sets of primary reels are provided in a rectangular configuration having space separating each set of primary reels.

The interface displays at least one secondary reel set. The secondary reel set has a plurality of symbols and an intersecting region. The intersecting region intersects a portion of at least one set of primary reels. Preferably the intersecting region of the set of secondary reels comprises several portions that each overlaps a portion of each set of primary reels. The size of the overlapping portion may be defined by the size of a symbol position of the symbols of the sets of primary reels. The intersecting region may overlap one single symbol position; however, in another embodiment the overlap may cover two or more symbol positions.

According to an aspect of the invention there may be an improvement in game control by providing combining the so termed "Left to Right" and "Adjacent" payline concepts.

"Left to Right": Prizes are for combinations left to right on selected lines, starting on the leftmost position of a payline.

Higher prizes are possible in lower of-a-kind range because there are less winning combinations than in games paying for adjacent symbols.

Even if there is an obvious number of the same kind of symbol on a winning line, no price is paid in case one or more reels to the left of said symbols don't match their kind.

"Adjacent": Prizes are for combination of adjacent symbols on selected lines.

Hence advantageously, in a high of-a-kind range, it is possible to pay for an obvious number of the same kind of symbols on adjacent reels.

In one embodiment, the interface displays multiple sets of primary reels positioned on the interface, preferably four sets of primary reels, and one set of secondary reels. The primary reels form a 3.times.4 matrix of the set of primary reels. The intersecting region of the secondary reels set overlaps and/or hides one of the plurality of symbols of each of the primary reels set. In particular, each set of the primary reels has a corner and the set of secondary reel has four corners, each of the four corners of the secondary reels set overlaps one respective corner of the set of primary reels, respectively.

A first pair of the set of primary reels align horizontally with each other, and the second pair of the primary reels sets underlie (aligns vertically) the first pair of primary reels sets, and also align horizontally with each other. The set of secondary reels interconnects the horizontally aligned primary reels to define a payline between the horizontally aligned primary reels, wherein the payline includes symbols provided by the set of secondary reels and the horizontally aligned sets of primary reels.

Two of the primary reels sets align vertically with each other, the set of secondary reels interconnect the vertically aligned primary reels to define an extended reel between the two vertically aligned primary reels. The extended reel includes symbols provided by at least one reel of the set of secondary reels and by the vertically aligned primary reels.

DETAILED DESCRIPTION

Figure 1:
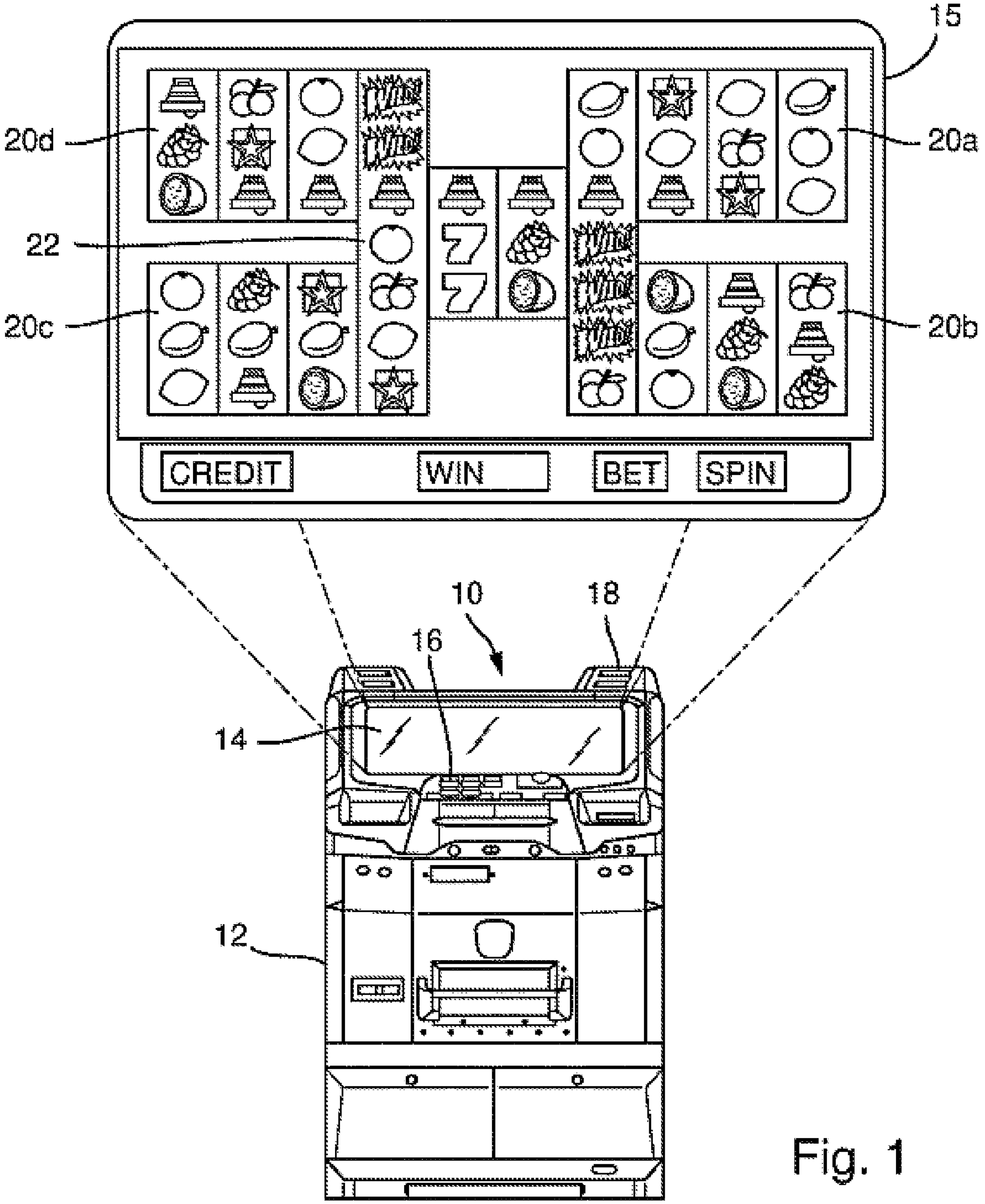
FIG. 1 is perspective view of a gaming machine in accordance with the present invention having an exploded view of the interface.

FIG. 1 shows a gaming machine generally designated with the reference numeral 10. The gaming machine 10 includes a housing 12 with an interface 14. The interface includes an exemplary screen shot 15 exploded from the interface 14. The gaming machine 10 is preferably a slot machine. The interface 14 displays four sets of electronically generated primary reels 20*a*, 20*b*, 20*c* and 20*d*. The interface 14 also displays a set of secondary reels 22, which partially overlaps each of the primary reels 20*a*, 20*b*, 20*c*, and 20*d*. The overlapping reel configuration is shown particularly in the screen shot 15.

The interface 14 displays slot machine play. The housing 12 includes buttons 16 that can be activated by a user to facilitate game play, and at least one speaker 18. While buttons 16 are used, the interface 14 may also be touch-sensitive to receive direct input from a user.

It can be appreciated that hybrid arrangements having both digital and mechanical components are contemplated herein interface 14. Accordingly, it is understood that the interface can be transparent to enable a player to view sets mechanical reels, or the interface can present electronic images of reels, or both.

In one embodiment the sets of primary reels 20*a*, 20*b*, 20*c*, and 20*d* are mechanical reels underlying the interface 14, which is transparent to enabler a user to see symbols presented by the sets of primary reels 20*a*, 20*b*, 20*c*, and 20*d*. The set of secondary reels 22 is electronically displayed to overlap portions of the sets of primary reels 20*a*, 20*b*, 20*c*, and 20*d* to enable unique payline structures.

There are several variations contemplated by the present invention, and with the popularity of electronic gaming interfaces, the term "reel" and "set of reels" should be broadly understood to include any set of images, defining a matrix, that are used to establish paylines.

Figure 2:
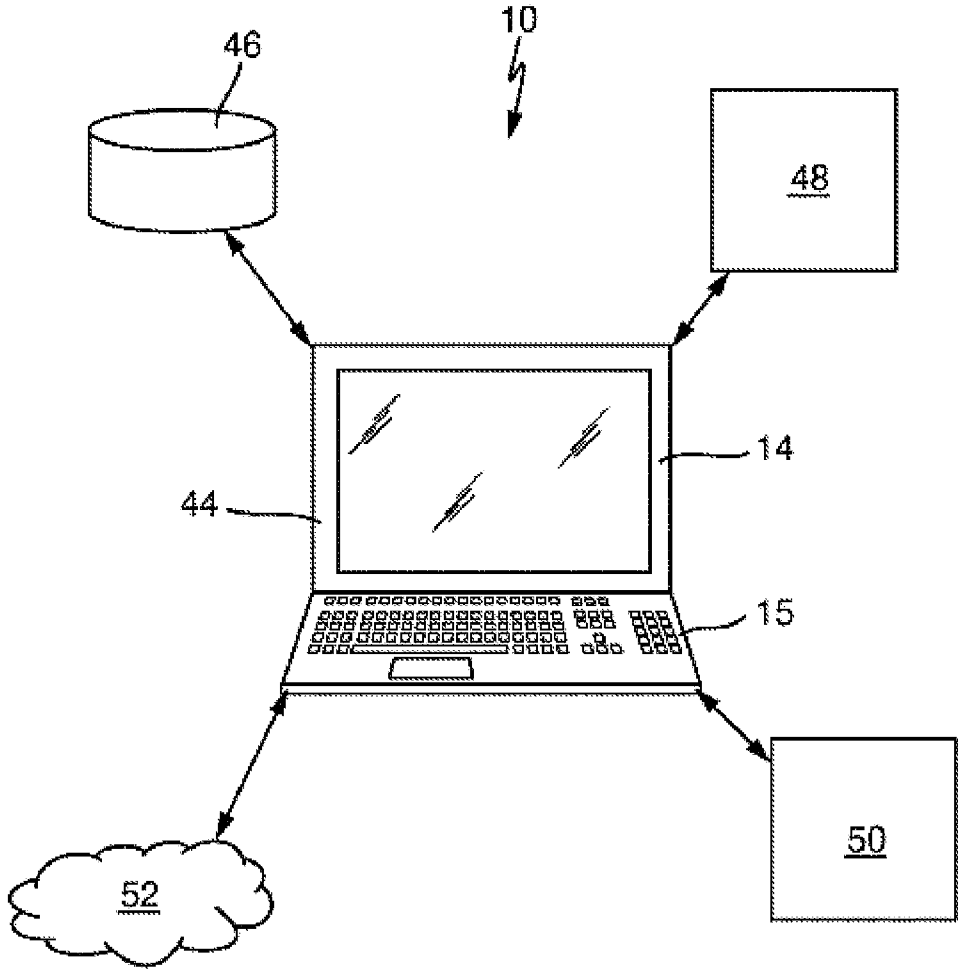
FIG. 2 is a gaming machine loaded on a computer.

FIG. 2 shows an alternate hardware layout for the gaming machine 10. The gaming machine 10 includes a general purpose computer 44 having an interface 14 including a display 17 and a keyboard 19. The computer 44 houses a processor 48, memory 46 and interface hardware 50. The processor 48 controls operation of the gaming machine 10 by employing game software stored in the memory 46.

The computer 44 has networking hardware for communicating with a network 52. Game play, and particularly payouts, may utilize a network connection to enable multiple gaming machines to enable users to compete for prizes, and to keep track of game results and payouts.

The processor 48, memory 46, and the interface hardware 50 cooperate in operative communication to display reels on the display 17 of the computer 44. The memory 46 stores software instructions for the processor 48 to execute, and the display presents the reels and enables user interaction. Particularly, keystroke instructions from the keyboard 19 initiate game play and select betting options. In an alternate embodiment, the interface 14 includes a touch-sensitive screen in addition to, or instead of, the keyboard 19 to enable user interaction.

Figure 3:
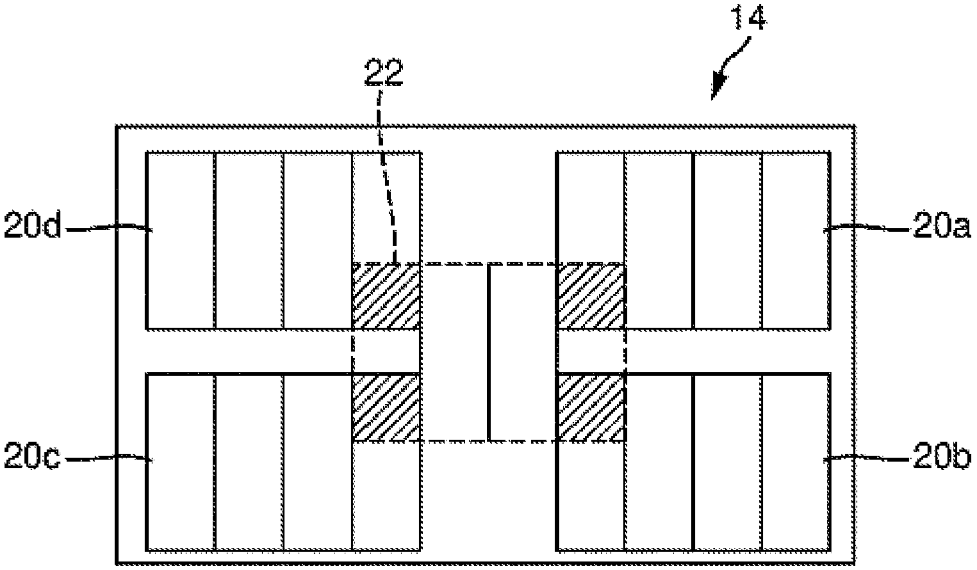
FIG. 3 is an interface of the gaming machine showing four primary reels intersecting a secondary reel.

FIG. 3 shows an interface 14 having a screen shot 15 displaying four sets of primary reels 20*a*, 20*b*, 20*c* and 20*d*. One set of secondary reels 22 is shown outlined with a dotted line and having a 3.times.4 matrix of symbol positions. The set of secondary reels 22 intersects each of the primary reels 20*a*, 20*b*, 20*c* and 20*d*. In one embodiment, the set of secondary reels and each of the sets of primary reels 20*a*, 20*b*, 20*c* and 20*d* may comprise an overlapping portion. In an alternate embodiment, each set of the primary reels 20*a*, 20*b*, 20*c* and 20*d* overlap the secondary reel 22. The secondary reel 22 interconnects and intersects the four primary reels 20*a*, 20*b*, 20*c* and 20*d* to enable paylines to be defined across multiple reels. Enabling paylines to be defined across multiple reels enables a user to easily identify the paylines, while making the game interesting to watch. It is thus possible to enable the game with a less than average number of paylines to minimize the time and computational complexity associated with highly complex payline schemes.

The set of secondary reels 22 and the sets of primary reels 20*a*, 20*b*, 20*c* and 20*d* are the same size, however, it can be appreciated that the secondary set of reels 22 may be larger, or smaller, than the sets of primary reels 20*a*, 20*b*, 20*c* and 20*d*, any overlapping portion would have to be scaled to achieve an overlapping effect.

Figure 4:
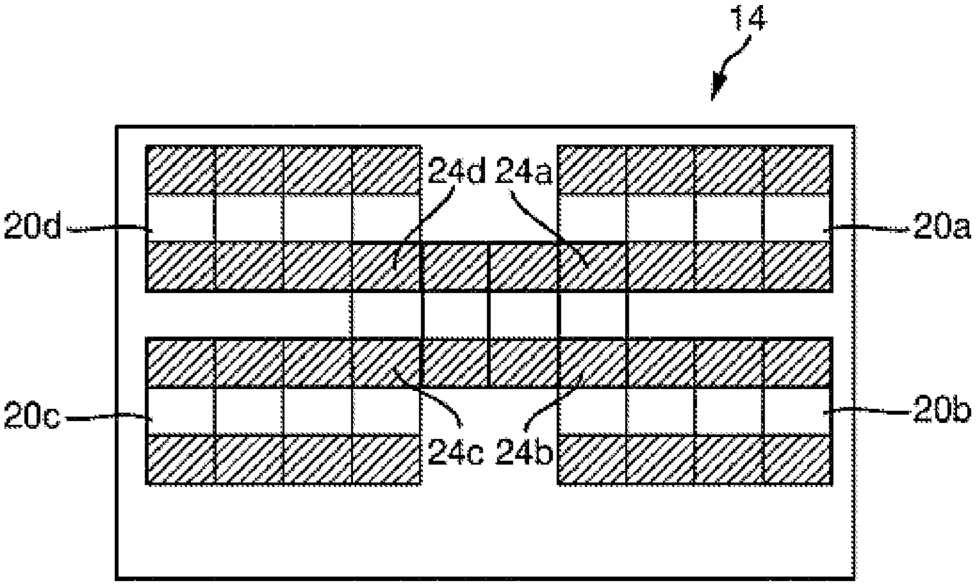
FIG. 4 is an interface of the gaming machine showing paylines extending horizontally across the primary reels and the secondary reel.

FIG. 4 shows each set of primary reels 20*a*, 20*b*, 20*c* and 20*d*, each set having a matrix of 3.times.4 symbols, and the set of secondary reels 22 also has a 3.times.4 matrix of visible symbols. A 3.times.4 matrix as defined herein has three rows and four columns, each column representing a visible portion of a reel for instance. The set of secondary reels 22 is indicated by a dotted line surrounding the secondary reels. The set of primary reels 20*a*, 20*b*, 20*c* and 20*d* and secondary reels 22 have matrices of the same complexity and size, creating symmetry which is advantageous for allocation respectively position at a display and visually pleasing to many users. Each location among the matrices is occupied by a symbol, and each location among the matrices is the same size and shape. The symbols may be alpha-numeric, pictorial, video images, include lights of particular colors, or other indicia utilized in the field of slot machines.

Various embodiments of the invention anticipate that the set of primary reels 20*a*, 20*b*, 20*c* and 20*d* and the set of secondary reels 22 can have a greater or lesser number of rows and columns, and the 3.times.4 configuration is shown by example. Also, while a single secondary reel 22 is presented, more than one set of secondary reels 22 can be displayed on the interface 14 in accordance with alternate embodiments of the invention.

The set of reels 20*a* and 20*b* are spaced a distance roughly equal to the thickness of two matrix columns from the set of reels 20*d* and 20*c*, respectively. In the specific embodiment shown the set of reels 20*d* and 20*a* are spaced at a distance roughly equal to the thickness of one matrix row from the reels 20*c* and 20*b*, respectively. This configuration enables two matrix columns and two matrix rows of the secondary reels 22 to intersect portions of the set of primary reels 20*a*, 20*b*, 20*c* and 20*d*. On the other hand, this specific configuration leaves a portion of the secondary reel 22 matrix that does not intersect any of the sets of primary reels. In particular, in one specific embodiment, the secondary reel set 22 has eight matrix positions having symbols which stand alone and do not intersect any of the symbols presented on the set of primary reels 20*a*, 20*b*, 20*c* or 20*d*.

In one embodiment, the matrix rows and columns of the set of primary reels 20*a*, 20*b*, 20*c*, 20*d*, have the same size and shape as the set of secondary reels 22 matrix rows and columns. Also the matrices of all reels have an equal number of rows and columns. In an alternate embodiment, the number of rows and columns of the primary matrices are equal, but different in number than the rows and columns of the secondary matrix.

In a preferred embodiment all the sets of reels are represented with a viewable 3.times.4 matrix having corners. The secondary matrix of the secondary set of reels 22 in the present case has four corners 24*a*, 24*b*, 24*c* and 24*d* that each overlaps a portion of each respective set of primary reel 20*a*, 20*b*, 20*c*, 20*d*. Preferably, each of the four corners 24*a*, 24*b*, 24*c* and 24*d* of the secondary matrix of the secondary set of reels 22 overlap one matrix location of each respective primary sets of reels 20*a*, 20*b*, 20*c*, 20*d*. In other words, each of the respective four corners 24*a*, 24*b*, 24*c* and 24*d* of the secondary matrix overlaps a (symbol position of the) nearest corner of a respective nearest set of primary reel 20*a*, 20*b*, 20*c*, 20*d*.

In a preferred embodiment, a minimum of five horizontal paylines are provided for a minimum bet or in other words: one can play a minimum of 5 lines (the middle line of each reel set). These paylines are depicted by white squares in FIG. 4, in other words, all symbols except the white ones (the middle line of each reel set) are inactive. Each set of reels displays a matrix of symbols; after a reel spin the reels may stop at random position and the symbols falling on one of the five horizontal paylines are utilized to determine a payout.

Where a maximum bet is placed of 25 credits, for example, all paylines and all symbols become active as a result of the 25 credit bet. When a lesser bet is placed, only a subset of possible paylines become active.

Figure 5:
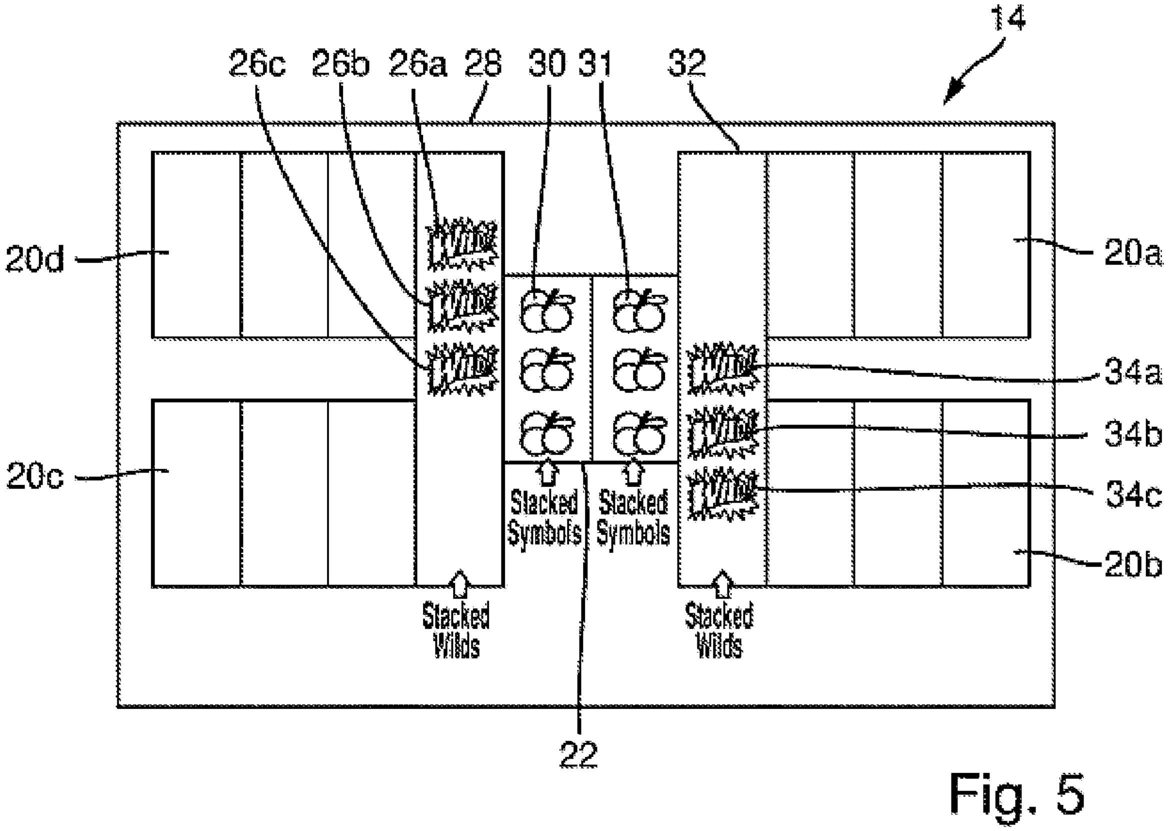
FIG. 5 is an interface of the gaming machine showing symbols.

FIG. 5 shows three wild symbols 26*a*, 26*b* and 26*c* arranged in the 4th column 28 of the set of reels 20*d* and 20*c*, and three wild symbols 34*a*, 34*b*, 34*c* arranged in the first column 32 of the set of reels 20*a* and 20*b*. The symbol 26*c* is interposed between the reel 20*d* and the reel 20*c*. The symbol 26*b* represents an intersecting region overlapping a corner of the matrix 20*d* and a corner of the matrix 22.

Likewise, the symbol 34*a* is interposed between the reel set 20*a* and the reel set 20*b*. The symbol 34*b* represents an intersecting region overlapping a corner (the top left corner) of the reel set 20*b* and a corner (the bottom right corner) of the matrix of secondary reel set 22.

The intersecting arrangement of the primary set of reels 20*a*, 20*b*, 20*c* and 20*d* and the secondary set of reels 22 result in an extended reel arrangement creating a "super column" or "super reel". The column 28 and the column 32 each have seven rows in the present embodiment. The secondary matrix 22 further includes column 30 and column 31, each having three rows that are stand alone, being interposed respectively between the set of reels 20*d* and the set of reels 20*a*, and between the set of reels 20*c* and the set of reels 20*b*.

During game play the columns 28, 30, 31 and 32 form a virtual matrix having a row composition of 7-3-3-7, as shown. A virtual matrix is a hybrid matrix created by an overlap of the secondary reel 22 over the set of primary reels 20*a*, 20*b*, 20*c* and 20*d*. Paylines can be defined along any row, column, or other path that includes a single reel, or more than one reel.

During game play, the secondary set of reels 22 includes symbols that are arranged in a vertical stack of three. Here a cherry bunch represents stacked symbols. In this way, the secondary set of reels 22 often displays more than one of a single symbol, this attracts the attention of a user because more than one of the same symbol will likely appear and thus attract the eye of a user and higher win-amounts may result. An exception to this general approach to game play is where a scatter symbol appears and replaces one or more of the cherry bunch symbols.

Wild symbols 26*a*, 26*b*, 26*c*, 34*a*, 34*b* and 34*c* are used in accordance with game play rules. The columns 28 and 32 each include three wild symbols that appear in sequence in some portion of each column 28 and 32, respectively. The wild symbols 26*a*, 26*b*, 26*c*, 34*a*, 34*b* and 34*c* improve the chance of a payout along any of the horizontal rows in which they appear.

Figure 6:
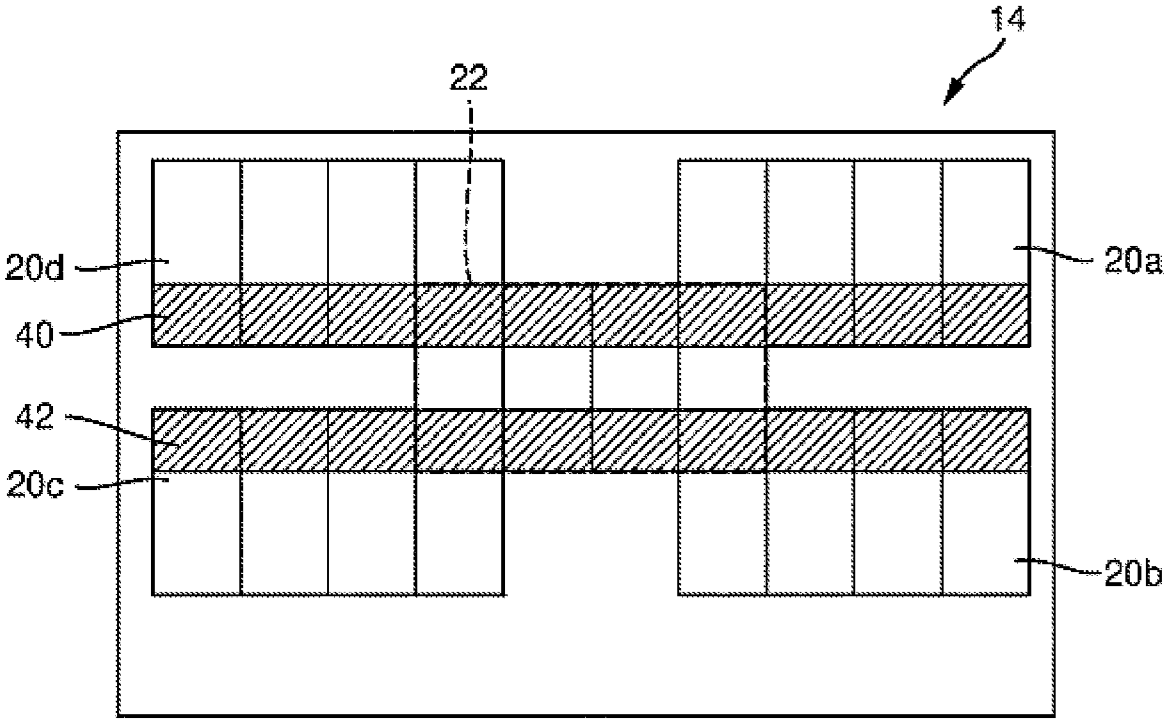
FIG. 6 is an interface of the gaming machine showing horizontal power lines.

FIG. 6 shows the alignment of the third row 40 of the primary set of reels 20*d* and 20*a*, which cross and include a top row of the set of secondary reels 22. FIG. 5 also shows the alignment of the first row 42 of the set of primary reels 20*c* and 20*b*, which cross and include the bottom row of the set of secondary set of reels 22.

The rows 40 and 42 define a horizontal payline named a "Power Line", which includes ten columns and thus, ten symbols, because the intersection of the secondary set of reels 22 with the primary sets of reels 20*d* and 20*c* links the primary sets of reels 20*d* and 20*c* to the primary sets of reels 20*a* and 20*b*, respectively, to enable a ten symbol payline along each row 40 and 42. It is exciting for a user to see all columns in a row across five reels aligns for a winning combination because when one of the rows 40 or 42 are activated, increased payouts are indicated.

Utilizing five sets of reels, including intersecting spaces, makes game play exciting and new. The intersecting five reel combination improves utilization of the interface area, as compared to alternate arrangements of multiple reel games. Another benefit of the present invention is that the computational complexity of defining and calculating paylines on a large matrix is minimized by reducing the number of paylines due to the novel alignment of reels. This enables improved gaming machine speed, without the need for increasingly robust processors, and other hardware.

Minimizing the number of paylines by using an intersecting matrix configuration also makes the game easier to understand for a user. In particular, the paylines are more readily identified by a user.

During game play, the power line is indicated on the interface 14 by each of the ten symbol paylines, which extend along rows 40 and 42. In the case where sets of reels have a different matrix size, then the ten symbol paylines may have more or less symbols. In any event the power line is intuitive and obvious to users of the gaming machine.

Figure 7:
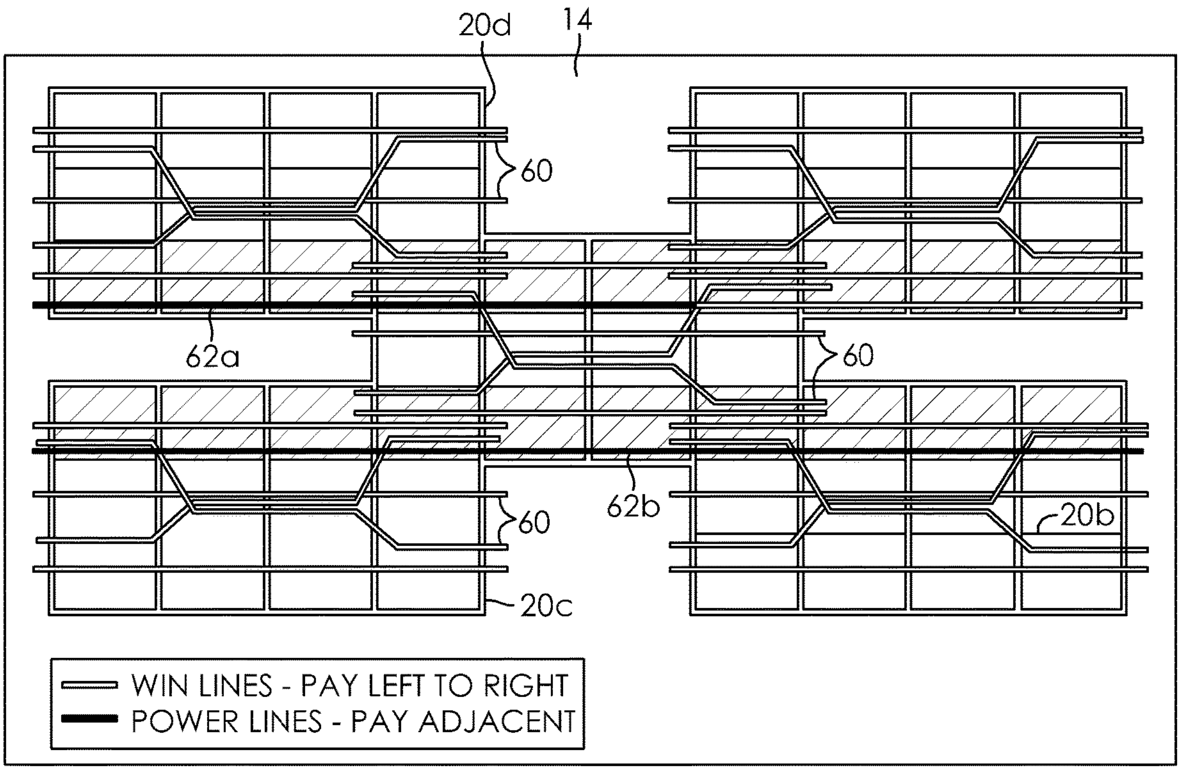
FIG. 7 is an interface of the gaming machine showing numerous paylines.

FIG. 7 shows the interface generally designated with the reference numeral 14 depicting a screen shot 15, and adding numerous possible paylines 60 defined thereon as darkened lines. The interface 14 also defines power lines 62*a* and 62*b*. Each power line 62*a* and 62*b* extends horizontally across the interface 14. The power lines 62*a* and 62*b* intersect and link the set of secondary reels 22 and the respective sets of primary reels 20*a*, 20*b*, 20*c*, and 20*d*.

Figure 8:
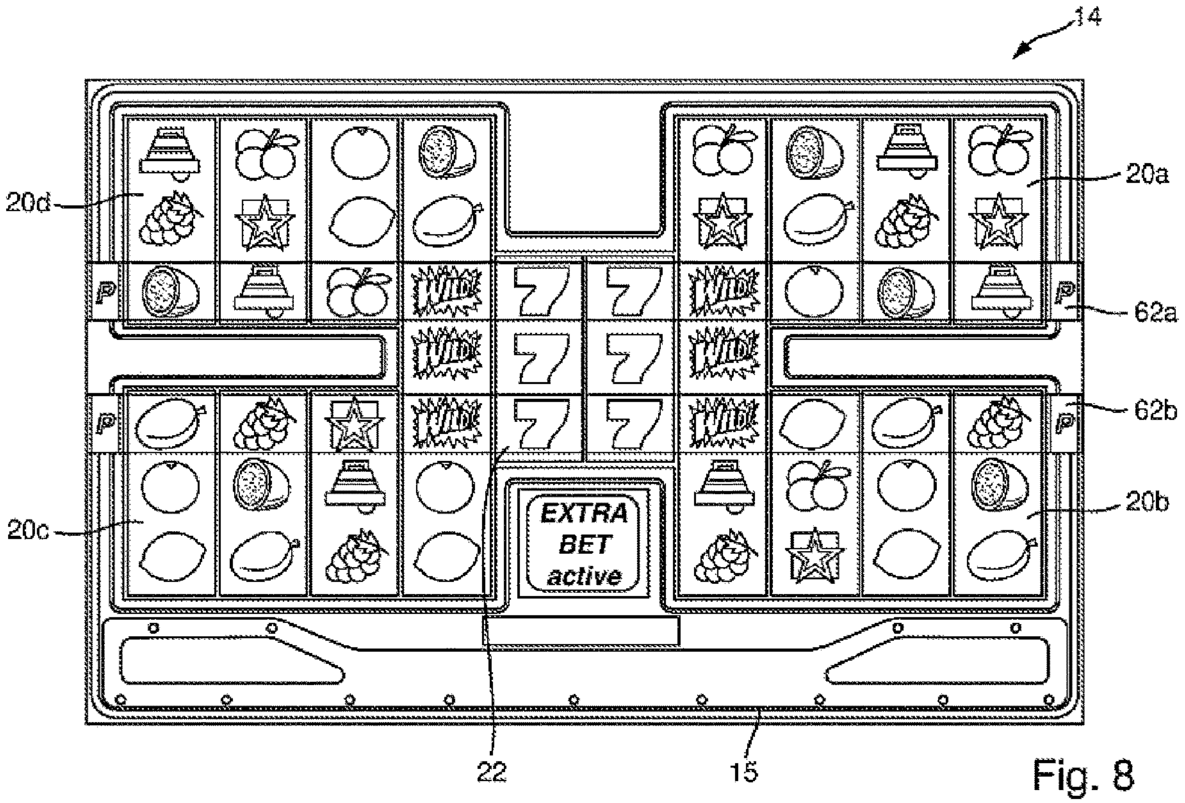
FIG. 8 is an interface of the gaming machine showing aligned wild symbols.

FIG. 8 shows the interface 14 of FIG. 7 having numerous symbols on each reel and the power lines 62*a* and 62*b*. The secondary set of reels 22 includes two vertical stacks of wild symbols, and two vertical stacks of the symbol "7". The secondary reel has four corners with one wild symbol on each corner. Accordingly, the corner-positioned wild symbols overlap one symbol of each of the matrices of the primary set of reels 20*a*, 20*b*, 20*c*, and 20*d*.

Figure 9:
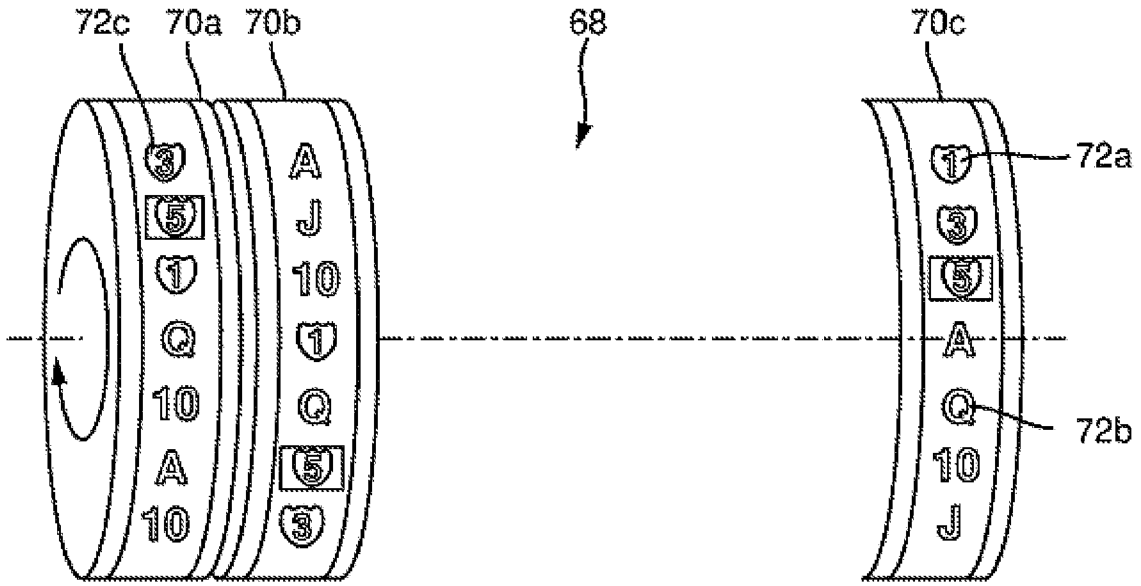
FIG. 9 is a set of mechanical reels in accordance with the present invention.
Figure 10:
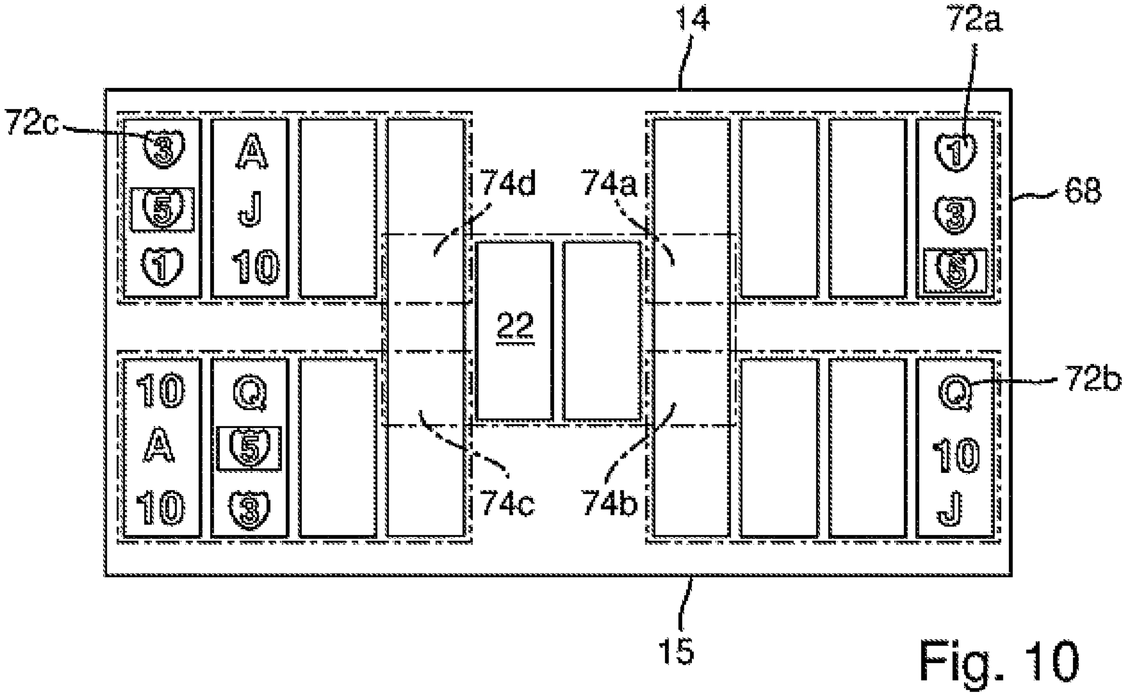
FIG. 10 is an interface of the gaming machine utilizing the set of reels of FIG. 9.

FIG. 9 and FIG. 10 together show an embodiment of the invention that imitates the use of four sets of primary reels, and a single set of secondary reels.

The interface 14 displays a portion of a single set of ten (10) reels, which are generally designated with the reference numeral 68. FIG. 9 shows three reels 70*a*, 70*b* and 70*c* and omits others for drawing clarity. The reels 70*a*, 70*b* and 70*c* are rotatably affixable in the housing 12 of the gaming machine 10 of FIG. 1. In particular, the set of ten reels 68 are positioned behind the interface 14 shown in FIG. 1.

The interface 14 has transparent portions to enable a user to clearly view symbols 72*a*, 72*b*, 72*c*, and other symbols, on the reels 70*a*, 70*b* and 70*c*. During operation the interface 14 overlies and displays the reels 72*a*, 72*b*, and 72*c* so that the symbols 72*a*, 72*b* and 72*c* can be clearly seen.

In this embodiment, the interface 14 is made from a glass or plastic glass panel having opaque, transparent and translucent areas, or any combination thereof. The transparent areas align to reveal operative portions of the underlying reels 70*a*, 70*b*, and 70*c* to a gaming machine user.

It can be appreciated that the interface 14 panel may be of an electronic transmissive LCD or OLED display. According to a further advantageous embodiment the set of reels 68 may be fully or partly images provided by an electronic video display (e.g. video monitor, LCD, LED, OLED, or similar) integrated with the interface 14.

FIG. 10 shows the interface 14 having transparent portions to enable a user to see the mechanical reels 70*a*, 70*b*, and 70*c* of FIG. 9. In this embodiment, the opaque and transparent portions of the interface 14 are arranged such as to achieve the same effect as shown in the screen shot 15 of FIG. 1, for example, i.e. to enable the interface 14 to imitate four sets of primary reels.

A portion of the secondary set of reels 22 overlaps a portion of the set of primary reels 68 at four intersecting regions 74*a*, 74*b*, 74*c* and 74*d*. The interface 14 is opaque or translucent at the four intersecting regions 74*a*, 74*b*, 74*c* and 74*d* to obscure symbols of the set of primary reels 68. Overlying the intersecting regions 74*a*, 74*b*, 74*c* and 74*d* are portions of the secondary set of reels 22, which clearly display symbols to a user. In this way the secondary set of reels 22 intersects and overlaps portions of the primary set of reels 68.

In one embodiment, the intersecting regions 74*a*, 74*b*, 74*c* and 74*d* are electronically displayed on the interface 14. The interface 14 obscures symbols from the set of primary reels at the intersecting regions 74*a*, 74*b*, 74*c* and 74*d*, and displays alternate symbols in the intersecting regions to simulate the set of secondary reels 22 at each intersecting region. In this way the primary set of reels 68, the interface display, and the overlying symbols cooperate to create the effect of having four sets of primary reels and one set of secondary reels.

In a variation of this embodiment, the interface is opaque at the intersecting regions to fully obscure symbols of the set of primary reels at the intersecting regions. The interface 14 displays seven rows of the set of primary reels, and ten columns.

The row and column in the upper left represents row one, column one, for clarity. Other rows and columns are identified accordingly in ascending numerical order. In the example shown, the interface 14 displays seven rows of the set of primary reels 68, and ten columns. The interface 14 displays the fifth and sixth column of the fourth row of the set of primary reels and obscures the other columns of the fourth row of the set of primary reels 68. The interface 14 also displays each column of third and fifth row of the set of primary reels 68, except for the intersecting regions 74*a*, 74*b*, 74*c* and 74*d*, which display symbols to simulate a set of secondary reels.

In some inventive embodiments, one or more of primary or secondary reels is equipped with a holographic sticker.

While the present invention is explained in terms of various preferred embodiments, as depicted in the drawings and the specification herein, the true scope of the invention is defined by the appended claims. Further the term reel, as used herein indicates a set of virtual or physical rotating devices that randomly, or pseudo randomly, present symbols on the interface. In one embodiment, for example, four sets of primary reels can be imitated in a creative manner by a single physical or virtual reel. Since the invention is likely to manifest in electronic form, any verbiage describing sets of reels should be understood to include simulated forms of the same.

The invention claimed is:

1. A gaming machine operable under control of a processor, comprising:

a housing;

a processor for controlling the gaming machine;

a user interface supported by said housing, said interface in electronic communication with the processor;

a plurality of sets of primary reels displayed by the interface, the plurality of sets of primary reels having a plurality of symbols presented orthogonally relative to a face of the plurality of sets of primary reels;

at least one set of secondary reels displayed by the interface, the at least one set of secondary reels having a plurality of symbols presented orthogonally relative to a face of the at least one set of secondary reels; and wherein the plurality of sets of primary reels and the at least one set of secondary reels each comprise an intersecting region wherein at least a portion of one of the sets of primary reels and a portion of the at least one set of secondary reels intersect each other, defining at least one horizontal payline, wherein the payline includes symbols provided by the set of secondary reels and symbols of the at least a portion of one of the sets of primary reels.

2. The gaming machine as set forth in claim 1, wherein the at least one set of secondary reels overlaps a portion of each of the plurality of sets of primary reels.

3. The gaming machine as set forth in claim 2, wherein a subset of the plurality of primary reels align horizontally to define horizontally aligned primary reels, the at least one set of secondary reels interconnects the horizontally aligned primary reels to define a horizontal payline between the horizontally aligned primary reels, wherein the horizontal payline includes symbols provided by the at least one set of secondary reel and the horizontally aligned primary reels.

4. The gaming machine as set forth in claim 2, wherein a subset of the plurality of primary reels align vertically to define vertically aligned primary reels, the at least one set of secondary reels intersect at least a portion of the vertically aligned set of primary reels to define a vertical payline between the vertically aligned primary reels, wherein the vertical payline includes symbols provided by the secondary reel and the vertically aligned primary reels.

5. The gaming machine as set forth in claim 1, wherein four sets of primary reels are provided and each set of the plurality of sets of primary reels has a corner and the at least one set of secondary reels has four corners, each respective of the four corners overlaps a respective corner of the sets of primary reels.

6. The gaming machine as set forth in claim 1, wherein the gaming machine includes a kiosk.

7. The gaming machine as set forth in claim 1, further comprising a user activated input in electronic communication with said processor for facilitating game play.

8. The gaming machine as set forth in claim 7, wherein activation of said user activated input changes the symbols included in the paylines.

9. A gaming machine, comprising:

an electronic device for controlling a slot-machine game;

a user interface mounted on the electronic device, the interface in electronic communication with the electronic device;

a user activated input in electronic communication with said electronic device for facilitating game play;

a plurality of sets of primary reels displayed by the interface, the plurality of sets of primary reels having a plurality of symbols presented orthogonally relative to a face of the plurality of sets of primary reels;

at least one set of secondary reels displayed by the interface, the at least one set of secondary reels having a plurality of symbols presented orthogonally relative to a face of the at least one set of secondary reels and an intersecting region, the intersecting region intersects a portion of at least one set of the plurality of sets of primary reels;

wherein, the intersecting region links the plurality of sets of primary reels and the at least one set of secondary reels set to define two orthogonal paylines of symbols across the plurality of sets of primary reels and the at least one set of secondary reels.

10. The gaming machine as set forth in claim 9, wherein the interface displays at least two of the plurality of sets of primary reels and one set of secondary reels, the intersecting region of the one set of secondary reels overlaps a portion of each of the at least two of the plurality of sets of primary reels.

11. The gaming machine as set forth in claim 9, wherein a subset of the plurality of sets of primary reels align horizontally to define horizontally aligned primary reels, the set of secondary reels interconnects the horizontally aligned primary reels to define a horizontal payline between the horizontally aligned primary reels, wherein the horizontal payline includes symbols provided by the secondary reel and the horizontally aligned primary reels.

12. The gaming machine as set forth in claim 9, wherein a subset of the plurality of primary reels align vertically to define vertically aligned primary reels, the set of secondary reels intersect at least a portion of the vertically aligned set of primary reels to define a vertical payline between the vertically aligned primary reels, wherein the vertical payline includes symbols provided by the secondary reel and the vertically aligned primary reels.

13. The gaming machine as set forth in claim 9, wherein activation of said user activated input changes the symbols included in the paylines.

14. The gaming machine as set forth in claim 9, wherein the electronic device is a kiosk.

15. The gaming machine as set forth in claim 9, wherein the user interface is an electronic transmissive LCD or OLED display.

16. The gaming machine as set forth in claim 15, wherein the user interface is opaque or translucent at the intersecting regions between the portion of at least one set of the plurality of sets of primary reels and the at least one set of secondary reels.

17. The gaming machine as set forth in claim 15, wherein the intersecting regions are electronically displayed.

* * * * *